United States Patent
Shin

(10) Patent No.: US 12,526,240 B2
(45) Date of Patent: Jan. 13, 2026

(54) ETHERNET CONTROLLER FOR A VEHICLE AND DATA TRANSMISSION METHOD THEREOF

(71) Applicant: HYUNDAI AUTOEVER CORP., Seoul (KR)

(72) Inventor: HyungMin Shin, Goyang-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 344 days.

(21) Appl. No.: 18/082,204

(22) Filed: Dec. 15, 2022

(65) Prior Publication Data
US 2023/0283564 A1 Sep. 7, 2023

(30) Foreign Application Priority Data
Mar. 7, 2022 (KR) .................. 10-2022-0028756

(51) Int. Cl.
*H04L 47/27* (2022.01)
(52) U.S. Cl.
CPC .................................. *H04L 47/27* (2013.01)
(58) Field of Classification Search
CPC ......... H04L 47/27; H04L 47/10; H04L 47/11; H04L 47/19; H04L 47/50; H04L 45/60; H04L 69/16; H04L 69/12; H04L 69/18; H04L 29/06; H04L 29/08; H04L 12/28; H04L 12/26; H04L 12/44; H04L 12/66; H04L 12/56
USPC ....................................................... 370/235
See application file for complete search history.

(56) References Cited

U.S. PATENT DOCUMENTS

| | | | |
|---|---|---|---|
| 6,493,316 B1 | 12/2002 | Chapman et al. | |
| 6,961,539 B2 * | 11/2005 | Schweinhart | H04B 7/18582 455/12.1 |
| 7,376,737 B2 | 5/2008 | Berzosa et al. | |
| 7,688,842 B2 * | 3/2010 | Pullen | H04L 1/1854 370/428 |
| 8,169,911 B2 * | 5/2012 | Viger | H04L 47/40 370/235 |

(Continued)

FOREIGN PATENT DOCUMENTS

| | | |
|---|---|---|
| CN | 104137507 A | 11/2014 |
| CN | 104137507 B | 11/2018 |

(Continued)

OTHER PUBLICATIONS

Office Action cited in Korean patent application No. 10-2022-0028756; Jan. 18, 2024; 8 pp.

(Continued)

*Primary Examiner* — Man U Phan
(74) *Attorney, Agent, or Firm* — Lempia Summerfield Katz LLC

(57) ABSTRACT

An Ethernet controller for a vehicle includes a Transmission Control Protocol/Internet Protocol (TCP/IP) module configured to continuously transmit a series of data packets having a collective size as large as a set window size or less regardless of receiving acknowledgement (ACK) from a receiver, where the window size is initially set to a window size value acquired from the receiver. The Ethernet controller also includes a window size resetting unit configured to reset the window size to a reduced value when a duplicate acknowledgement (DUP ACK) is received from the receiver.

10 Claims, 4 Drawing Sheets

(56) References Cited

U.S. PATENT DOCUMENTS

| | | | |
|---|---|---|---|
| 8,593,954 B2* | 11/2013 | Zhuang | H04L 47/11 370/230 |
| 9,203,755 B1* | 12/2015 | Wong | H04L 41/5019 |
| 9,584,425 B2* | 2/2017 | Patel | H04L 47/27 |
| 10,405,238 B2* | 9/2019 | Kwak | H04L 47/283 |
| 10,462,702 B2* | 10/2019 | Lee | H04W 76/19 |
| 10,924,421 B2 | 2/2021 | Zhang | |
| 11,153,779 B2* | 10/2021 | Kanagarathinam | H04L 1/1858 |
| 11,215,993 B2 | 1/2022 | Lim | |
| 2004/0003105 A1 | 1/2004 | Berzosa et al. | |
| 2010/0020689 A1* | 1/2010 | Tang | H04L 47/12 370/235 |
| 2015/0117200 A1 | 4/2015 | Patel et al. | |
| 2016/0254974 A1* | 9/2016 | Dunn | H04L 67/565 370/252 |
| 2019/0319889 A1 | 10/2019 | Zhang | |
| 2020/0026290 A1 | 1/2020 | Lim | |
| 2024/0305414 A1* | 9/2024 | Wu | H04L 69/163 |
| 2024/0381137 A1* | 11/2024 | Kanamarlapudi | H04W 24/08 |

FOREIGN PATENT DOCUMENTS

| | | |
|---|---|---|
| CN | 111314961 A | 6/2020 |
| JP | 2006129024 A | 5/2006 |
| JP | 2014127790 A | 7/2014 |
| KR | 100564474 B1 | 3/2006 |
| KR | 20080092323 A | 10/2008 |
| KR | 100915996 B1 | 9/2009 |
| KR | 20190095487 A | 8/2019 |
| KR | 20190105539 A | 9/2019 |

OTHER PUBLICATIONS

Office Action cited in Chinese patent application No. 202211605652.9; Aug. 21, 2025; 14 pp.

* cited by examiner

ETHERNET CONTROLLER FOR A VEHICLE AND DATA TRANSMISSION METHOD THEREOF

CROSS-REFERENCE TO RELATED APPLICATIONS

This application claims priority to and the benefit of Korean Patent Application No. 10-2022-0028756, filed on Mar. 7, 2022, the entire contents of which are incorporated herein by reference.

TECHNICAL FIELD

The present invention relates to an ethernet controller for a vehicle, and more particularly, to an Ethernet controller adopting an AUTOSAR platform and a data transmission method thereof.

BACKGROUND

AUTomotive Open System Architecture (AUTOSAR) is a standard platform in which multiple finished car manufacturers, vehicle parts manufacturers, development tool producers, and semiconductor manufacturers participate. The AUTOSAR platform is designed in response to the rapid use increase of embedded software for vehicle electrical components.

In the past, a bus system used in a vehicle generally used communication standards such as CAN, LIN, FlexRay, MOST, etc. More recently, with the increase in the number of electronic control devices and the number of multimedia devices in the vehicle, Ethernet communication has become a communication standard used in the vehicle.

The Ethernet has become a part of the AUTOSAR standard after AUTOSAR version 4.0. A CAN or LIN, FlexRAY interface is directly implemented in a protocol data unit (PDU) interface of the AUTOSAR, while in an Ethernet interface (EthIf), raw data is provided to a Transmission Control Protocol/Internet Protocol (TCP/IP) stack or data is directly received in the TCP/IP stack.

In a TCP/IP protocol, data is transmitted in the unit of a packet, and a series of data packets of a predetermined collective size is continuously transmitted regardless of whether receipt of the data packets is acknowledged by transmission of an acknowledgement (ACK) by a receiver. However, packet loss may occur due to a hardware limit such as hardware queue of the receiver, particularly when mass data such as Over-the-Air (OTA) is transmitted/received. When packet loss occurs, the lost packet needs to be retransmitted. Time loss occurs due to packet loss and retransmission.

The foregoing is intended merely to aid in the understanding of the background of the present disclosure, and is not intended to mean that the present disclosure falls within the purview of the related art that is already known to those having ordinary skill in the art.

SUMMARY

Embodiments of the present disclosure provide an Ethernet controller for a vehicle and a data transmission method thereof. In various embodiments, the Ethernet controller is capable of suppressing time loss occurrence due to packet loss and packet retransmission when transmitting and receiving mass data.

The object of the present disclosure is not limited to the aforementioned object, and other objects, which are not mentioned above, can be apparent to a person having ordinary skill in the art from the following description.

In an embodiment, an Ethernet controller for a vehicle includes: a Transmission Control Protocol/Internet Protocol (TCP/IP) module configured to continuously transmit a series of data packets having a collective size as large as a set window size or less regardless of receiving acknowledgement (ACK) from a receiver, the window size being initially set to a window size value acquired from the receiver; and a window size resetting unit configured to reset the window size to a reduced value when a duplicate acknowledgement (DUP ACK) is received from the receiver.

According to an aspect, the window size resetting unit may be configured to reset the window size to a value corresponding to an amount of data in data packets continuously transmitted up to a data packet corresponding to the received DUP ACK.

According to another aspect, the window size resetting unit may be configured to reset the window size according to i) a number of data packets continuously transmitted up to a data packet corresponding to the received DUP ACK and ii) a maximum transmission unit (MTU) size.

According to an aspect, the window size resetting unit may be configured to reset the window size to a result of multiplication of i) the number of data packets continuously transmitted up to the data packet corresponding to the received DUP ACK with ii) the MTU size.

According to an aspect, the TCP/IP module may be configured to, when the DUP ACK is received, retransmit one or more data packets, in the series of data packets, that follow a data packet corresponding to the received DUP ACK, starting with a data packet that immediately follows the data packet corresponding to the received DUP ACK.

According to an aspect, the window size resetting unit may be configured to independently reset the window size for respective ones of a plurality of receivers according to respective DUP ACKs received from the plurality of receivers.

In another embodiment, a method for transmission of data by an Ethernet controller for a vehicle includes: setting a window size to a window size value acquired from a receiver; continuously transmitting a series of data packets having a collective size as large as the set window size or less regardless of receiving acknowledgement (ACK) from the receiver; resetting the window size to a reduced value when a duplicate acknowledgement (DUP ACK) is received from the receiver; and continuously transmitting another series of data packets having a collective size as large as the reset window size or less regardless of receiving ACK from the receiver.

In an aspect, resetting the window size may comprise resetting the window size to a value corresponding to an amount of data in data packets continuously transmitted up to a data packet corresponding to the received DUP ACK.

In another aspect, resetting the window size may comprise resetting the window size according to i) a number of data packets continuously transmitted up to a data packet corresponding to the received DUP ACK and ii) a maximum transmission unit (MTU) size.

In an aspect, resetting the window size may comprise resetting the window size to a result of multiplication of i) the number of data packets continuously transmitted up to the data packet corresponding to the received DUP ACK with ii) the MTU size.

In an aspect, the method may further include, when the DUP ACK is received, retransmitting one or more data packet, in the series of data packet, that follow a data packet corresponding to the received DUP ACK, starting with a data packet that immediately follows the data packet corresponding to the received DUP ACK.

In an aspect, resetting the window size may comprise resetting the window size independently for respective ones of a plurality of receivers according to respective DUP ACKs received from the plurality of receivers.

According to an embodiment of the present disclosure, a window size is reset according to a DUP ACK received from a receiver to avoid occurrence of time loss due to packet loss and packet retransmission when transmitting and receiving mass data in a vehicular Ethernet controller.

In an aspect, the window size is reset independently for each of a plurality of receivers according to respective DUP ACK received from the plurality of receivers to guarantee an optimal transmission speed for each receiver without incurring time loss due to packet loss and packet retransmission.

The effects of the present disclosure are not limited to the aforementioned effects, and other effects, which are not mentioned above, can be apparent to a person having ordinary skill in the art from the following description.

The foregoing summary is illustrative only and is not intended to be in any way limiting. In addition to the illustrative aspects, embodiments, and features described above, further aspects, embodiments, and features can become apparent by reference to the drawings and the following detailed description.

BRIEF DESCRIPTION OF THE DRAWINGS

In order that the disclosure may be well understood, there are now described various forms thereof, given by way of example, reference being made to the accompanying drawings, in which.

Figure 1:
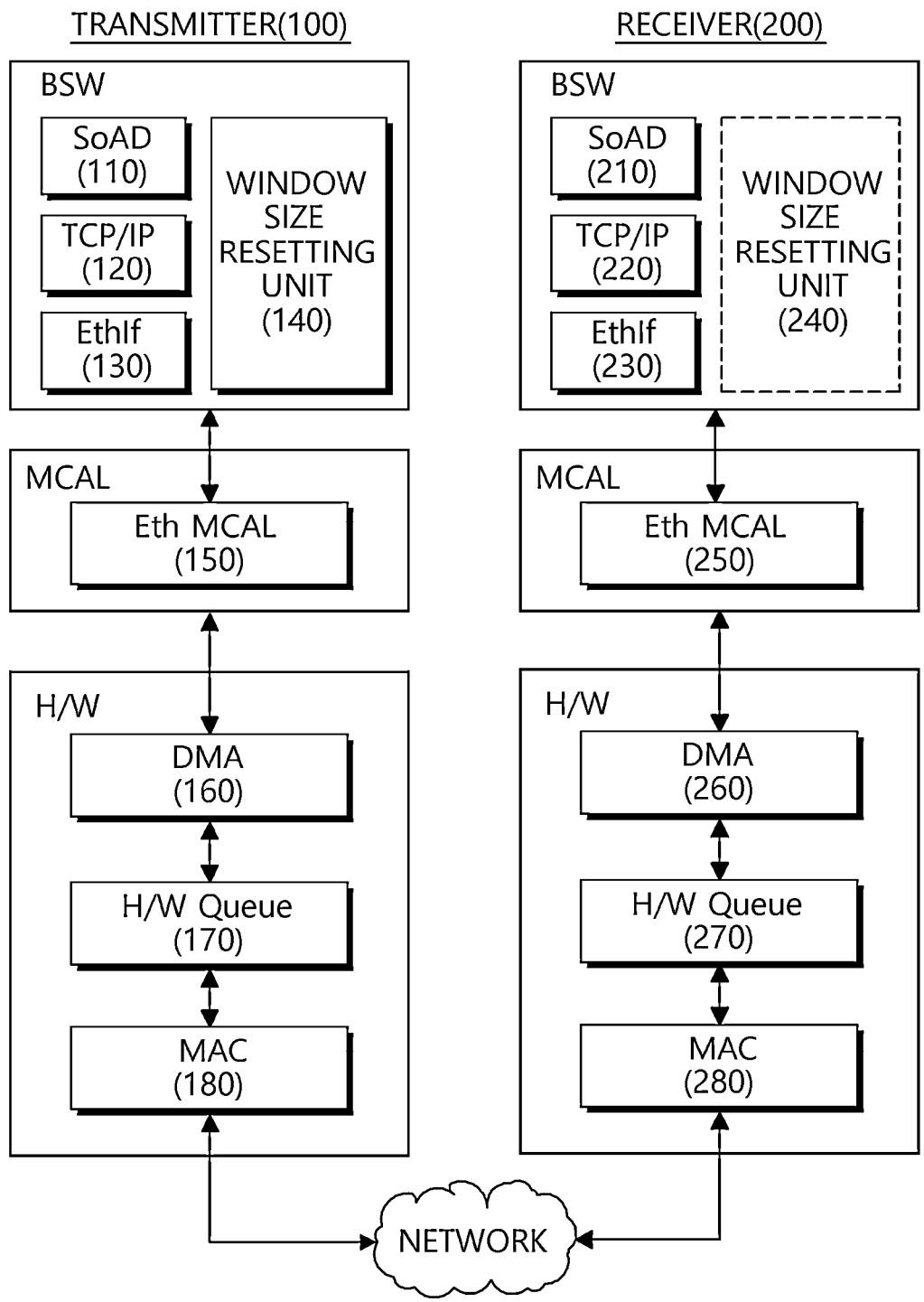
FIG. 1 illustrates a system that utilizes an Ethernet controller for a vehicle, according to an embodiment of the present disclosure.

It should be understood that the appended drawings are not necessarily to scale, presenting a somewhat simplified representation of various features illustrative of the basic principles of the disclosure. The specific design features of the present disclosure, including, for example, specific dimensions, orientations, locations, and shapes can be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. In the following description and the accompanying drawings, the same components represent the same reference numerals, respectively, and as a result, a duplicated description thereof is omitted. Further, a detailed explanation of a known related function or component may be omitted from the specification to avoid unnecessarily obscuring the subject matter of the present disclosure.

Throughout the specification, when it is described that any part "includes" any element, this means that unless described otherwise, the any part may further include another element without excluding another element.

Throughout the specification, when a certain part "includes" or "comprises" a certain component, this indicates that other components are not excluded, and may be further included unless otherwise noted. The same reference numerals used throughout the specification refer to the same constituent elements.

When a component, device, element, or the like of the present disclosure is described as having a purpose or performing an operation, function, or the like, the component, device, or element should be considered herein as being "configured to" meet that purpose or to perform that operation or function.

As publicly known in the art, some of exemplary forms may be illustrated in the accompanying drawings from the viewpoint of function blocks, units and/or modules. Those having ordinary skill in the art should understand that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in the present disclosure. Furthermore, each of the blocks, units and/or modules may be implemented by dedicated hardware or a combination of dedicated hardware for performing some functions and a processor for performing another function (for example, one or more programmed processors and related circuits).

FIG. 1 illustrates a system that utilizes an Ethernet controller for a vehicle, according to an embodiment. The system may include a transmitter 100 including an Ethernet controller (sometimes referred to herein as a "transmitter Ethernet controller 100" or simply "transmitter 100") and a receiver 200 including an Ethernet controller (sometimes referred to herein as a "receiver Ethernet controller 200" or simply "receiver 200"). The transmitter Ethernet controller 100 may include a socket adapter module 110, a Transmission Control Protocol/Internet Protocol (TCP/IP) module 120, an Ethernet interface module 130, a window size resetting unit 140, an Ethernet MCAL module 150, a direct memory access (DMA) module 160, a hardware queue 170, and a media access control (MAC) module 180. Similarly, the receiver Ethernet controller 200 may include a socket adapter module 210, a TCP/IP module 220, an Ethernet interface module 230, a window size resetting unit 240, an Ethernet MCAL module 250, a DMA module 260, a hardware queue 270, and a MAC module 280. The socket adapter modules 110 and 210, the TCP/IP modules 120 and 220, the Ethernet interface modules 130 and 230, and the window size resetting units 140 and 240 may be implemented in basic software (BSW). The Ethernet MCAL modules 150 and 250 may be implemented in a microcontroller abstraction layer (MCAL). The DMA modules 160 and 260, the hardware queues 170 and 270, and the MAC modules 180 and 280 may be implemented in hardware.

Data that is transmission-requested from an upper application (not illustrated) of the transmitter 100 may be transmitted to a network via the socket adapter module 110, the TCP/IP module 120, the Ethernet interface module 130, the Ethernet MCAL module 150, the DMA module 160, the hardware queue 170, and the MAC module 180. The data transmitted through the network may be received by an upper application (not illustrated) of the receiver 200 via the MAC module 280, the hardware queue 270, the DMA module 260, the Ethernet MCAL module 250, the Ethernet interface module 230, the TCP/IP module 220, and the socket adapter module 210 of the receiver Ethernet controller 200.

In an embodiment, when the transmitter Ethernet controller 100 intends to transmit data to the receiver Ethernet controller 200, the transmitter Ethernet controller 100 acquires a receiver window size value in a 3-way handshake with the receiver Ethernet controller 200, and sets the window size of the TCP/IP module 120 to a corresponding value. Then, the TCP/IP module 120 continuously transmits a series of data packets of a collective size as large as the set window size or less regardless of receiving any acknowledgement (ACK) from the receiver.

In general, there may be a limit in a capacity of the hardware queue 270 of the receiver Ethernet controller 200. Also a Reduced Gigabit Media Independent Interface (RG-MII), which may be an interface between the MAC module 280 and the hardware queue 270, may have a speed that is slower than a speed of an interface between the hardware queue 270 and the DMA module 260. For example, RGMII may have a speed on the order of gigabits per second (Gbps) or gigahertz (GHz), whereas the interface between the hardware queue 270 and the DMA module 260 may have a speed on the order of megabits per second (Mbps) or megahertz (MHz). Thus, packet loss may occur in the receiver Ethernet controller 200 due to the capacity limitation of the hardware queue 270 and a speed mismatch. The TCP/IP module 220 of the receiver Ethernet controller 200 may retransmit an ACK, i.e., transmits a duplicate ACK (DUP ACK), when a data packet of which order is inconsistent due to packet loss is received. When the transmitter Ethernet controller 100 receives the DUP ACK from the receiver, the TCP/IP module 120 may retransmit one or more data packet that were transmitted following the data packet corresponding to the received DUP ACK, and as a result, time loss may occur. Because such time loss may continuously occur whenever a series of data packets having a collective size corresponding to an initially set window size are transmitted, time loss may become a very serious problem, particularly when mass data is transmitted.

In an embodiment, when the transmitter Ethernet controller 100 receives a DUP ACK from the receiver, the window size resetting unit 140 resets the window size to a reduced value according to the DUP ACK to allow the TCP/IP module 120 to transmit the data packet according to the reset window size, thereby preventing packet loss.

In an example, the window size may be reset to a value corresponding to a quantity (e.g., a number of bytes) of data in data packets which are continuously transmitted up to (e.g., up to and including) the data packet corresponding to the received DUP ACK. As another example, the window size may be reset to a value corresponding to a result of multiplication of i) a number of data packets which are continuously transmitted up to (e.g., up to and including) the data packet corresponding to the received DUP ACK with ii) a maximum transmission unit (MTU) size, for example according to: (Number of data packets continuously transmitted up to and including data packet corresponding to DUP ACK)×(MTU size).

In an embodiment, the MTU size may be 1500 bytes, for example. Generally, as used herein, the term "up to" may refer to "up to and including." Thus, for example, the expression "continuously transmitted up to a data packet corresponding to a received DUP ACK" may also mean "continuously transmitted up to and including a data packet corresponding to a received DUP ACK."

As just an example, the window size may initially be set to 12000 bytes, which may be a value acquired from the receiver. The TCP/IP module 120 may continuously transmit 8 data packets (12000 bytes) of 1500 bytes (regardless of ACK reception), and a DUP ACK may be received for a fourth data packet from the receiver. This indicates that packet loss occurs in a fifth data packet. For example, four data packets are normally received, but, due to a limitation of the hardware queue of the receiver, the fifth data packet is lost. Therefore, the window size resetting unit 140 may reset the window size to a value corresponding to the quantity of data (6000 bytes) in the data packets that are continuously transmitted up to and including the fourth data packet, or may reset the window size to a value corresponding to a result of multiplication of the number of continuously transmitted data packets (four, in this example) with an MTU size (e.g., 1500 bytes)=6000 bytes. Then, after retransmitting fifth to eighth data packets due to the DUP ACK received for the fourth data packet, the TCP/IP module 120 may continuously transmit four data packet of 1500 bytes each (6000 bytes) according to 6000 bytes indicated by the reset window size (regardless of ACK reception).

Figure 2:
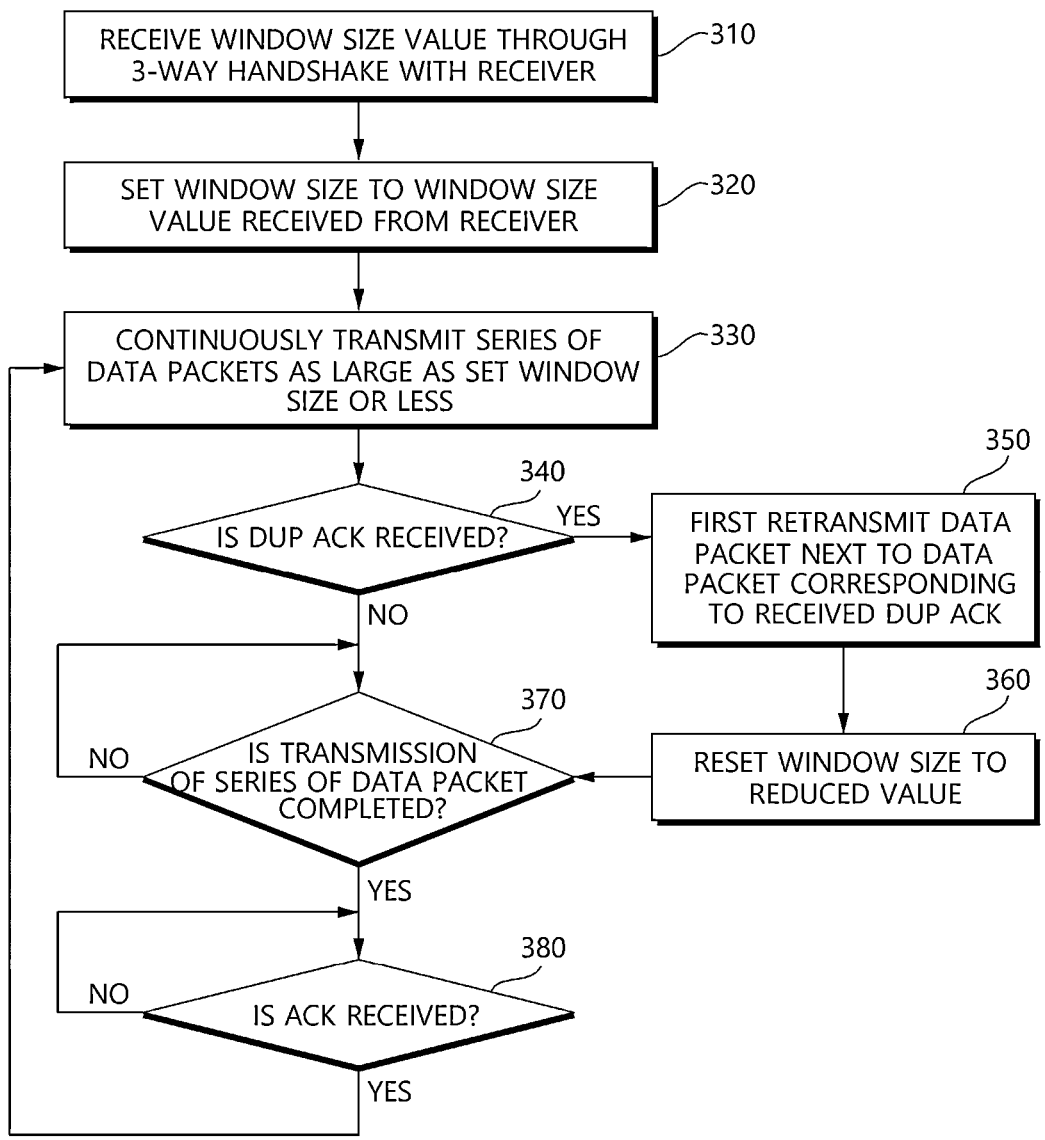
FIG. 2 is a flowchart of a method for transmission of data by a transmitter Ethernet controller, according to an embodiment of the present disclosure.

FIG. 2 is a flowchart of a method for transmission of data by the transmitter Ethernet controller 100, according to an embodiment.

In step 310, the TCP/IP module 120 receives a window size value in a 3-way handshake with a receiver.

In step 320, the TCP/IP module 120 sets a window size to the window size value received from the receiver.

In step 330, the TCP/IP module 120 continuously transmits a series of data packets having a collective size as large as the set window size or less regardless of receiving any ACK from the receiver.

When a DUP ACK is received from the receiver due to packet loss in the receiver (step 340), in step 350, the TCP/IP module 120 first retransmits one or more data packets that follow a data packet corresponding to the received DUP ACK, starting with a data packet that immediately follows the data packet corresponding to the received DUP ACK.

In step 360, the window size resetting unit 140 resets the window size of the TCP/IP module 120 to a reduced value. For example, the window size is reset to a values corresponding to the quantity of data in data packets continuously transmitted up to the data packet corresponding to the received DUP ACK, or is reset to a result of multiplication of i) the number of data packets continuously transmitted up the data packet corresponding to the received DUP ACK with ii) a maximum transmission unit (MTU) size.

When transmission of data packets to be continuously transmitted is completed (step 370), and at least one ACK is received from the receiver (step 380), the process returns to step 330 and the TCP/IP module 120 continuously transmits a series of data packets as large as the window size or less reset in step 360 regardless of receiving ACK from the receiver.

In an example, after the window size is reset in step 360, packet loss does not occur in the receiver, so DUP ACK reception and the data packet retransmission do not occur.

Figure 3A:
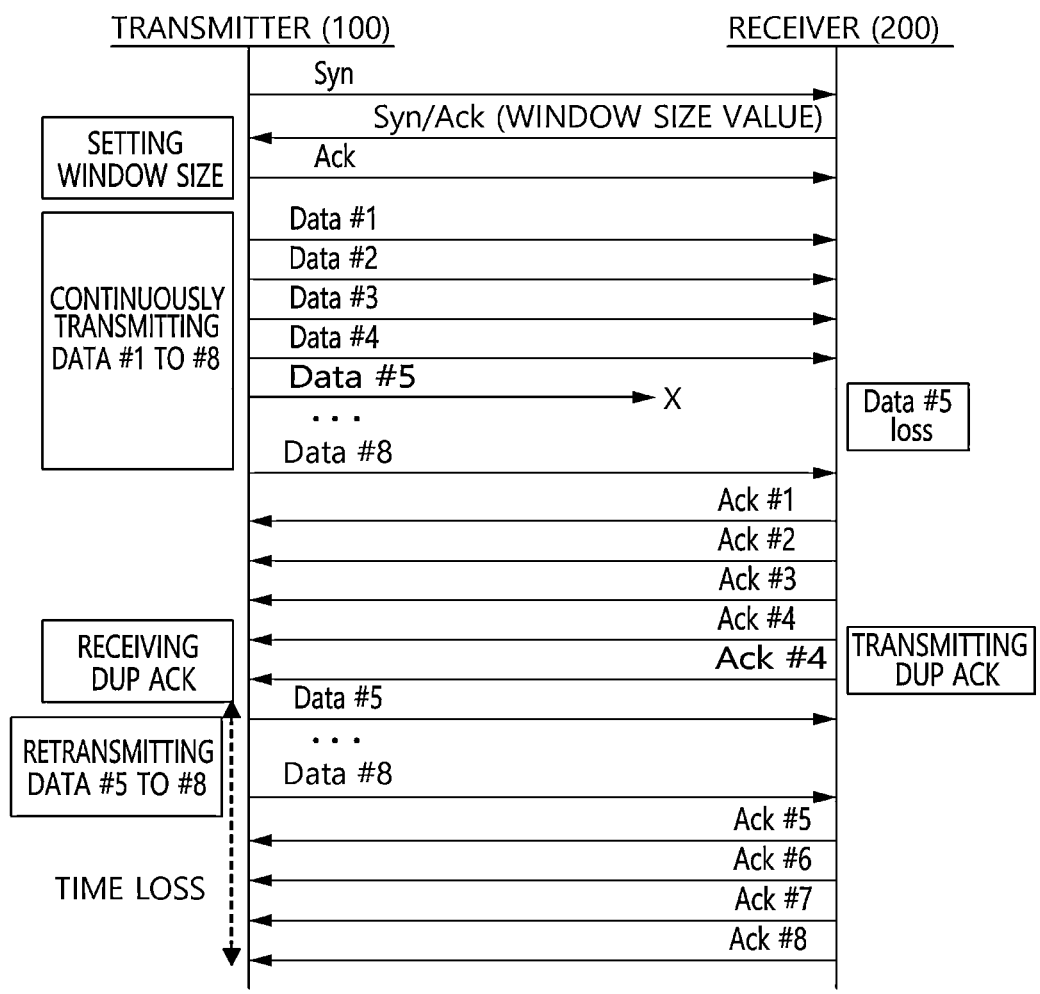
FIGS. 3A and 3B are data flowcharts illustrating an example of a process in which data is transmitted from a transmitter to a receiver, according to an embodiment of the present disclosure.
Figure 3B:
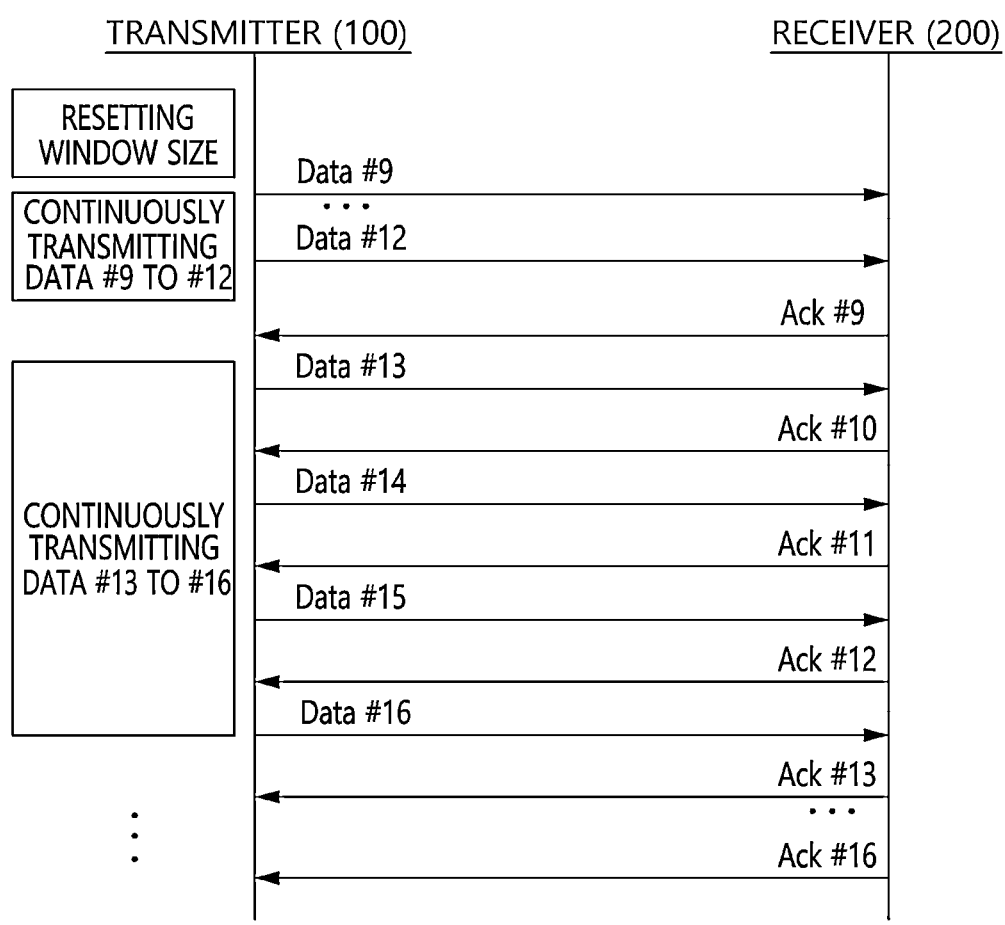

FIGS. 3A and 3B are data flowcharts illustrating an example of a process in which data is transmitted from a transmitter to a receiver, according to an embodiment.

Referring to FIG. 3A, 3-way handshake is performed in which the transmitter Ethernet controller 100 transmits Syn, the receiver Ethernet controller 200 transmits Syn/Ack including a window size value, and the transmitter Ethernet controller 100 transmits an Ack.

The TCP/IP module 120 of the transmitter Ethernet controller 100 sets the window size to the window size value (e.g., 12000 bytes) received from the receiver.

The TCP/IP module 120 continuously transmits 8 data packets (Data #1 to #8) of 1500 bytes, which correspond to 12000 bytes. In the illustrated example, packet loss of a fifth data packet (Data #5) occurs in the receiver.

The receiver Ethernet controller 200 transmits a respective ACK (ACK #1 to #4) for each of the first to fourth data packets (Data #1 to #4) which are normally received, and since a sixth data packet (Data #6) is received next after the fourth data packet (Data #4), the receiver Ethernet controller 200 retransmits ACK #4 for the fourth data packet (Data #4) (DUP ACK).

The TCP/IP module 120 receives DUP ACK (ACK #4) and retransmits data packets (Data #5 to #8) that follow the data packet (Data #4) corresponding to ACK #4. In this case, time loss occurs during transmission of the data packets (Data #5 to #8) after reception of the DUP ACK (ACK #4).

Referring to FIG. 3B, because the DUP ACK (ACK #4) is received as illustrated in FIG. 3A, the window size resetting unit 140 resets the window size to an amount (6000 bytes) (or 4×MTU size (1500)=6000 bytes) of data in data packets (Data #1 to #4) continuously transmitted up to, and including, the data packet (Data #4) corresponding to the DUP ACK (ACK #4).

As the window size is reset to 6000 bytes, the TCP/IP module 120 continuously transmits 4 data packets (Data #9 to #12) of 1500 bytes, which correspond to 6000 bytes. When the ACK (ACK #9) is received for at least one of 4 data packets (Data #9 to #12) continuously transmitted, the TCP/IP module 120 continuously transmits 4 next data packets (Data #13 to #16). After the window size is reset by considering the hardware queue of the receiver, packet loss does not occur. Accordingly, time loss also does not occur.

Although embodiments are generally described herein as including one receiver as an example, in other embodiments, there may be a plurality of receivers. When there is a plurality of receivers, the hardware queue may vary for each receiver, and reception of the DUP ACK from the receivers may also vary. For example, ACK #4 may be received from one receiver as the DUP ACK, and ACK #6 may be received from another receiver as the DUP ACK. As such, when there is a plurality of receivers, the window size resetting unit 140 may reset the window size independently for each receiver according to the DUP ACK received from the receiver. For example, the window size may be reset to 6000 bytes for the receiver from which ACK #4 as received as the DUP ACK, and the window size may be reset to 9000 bytes for the receiver from which ACK #6 is received as the DUP ACK. Therefore, optimal transmission speed may be guaranteed for each receiver based on the hardware queue of the receiver, in at least some embodiments.

Combinations of each block of the accompanying block diagrams in the present disclosure and each step of the flowcharts may be performed by computer program instructions. The computer program instructions may be implemented by a universal computer, a special computer or a processor of other programmable data processing equipment. The instructions performed by the computer or a processor of other programmable data processing equipment generate a means of performing functions described in each block of the block diagrams or each step of the flowcharts. The computer program instructions may also be stored in a computer usable or computer readable non-transitory memory which may direct a computer or other programmable data processing equipment in order to implement a function in a specific scheme. The instructions stored in the computer usable or computer readable non-transitory memory can thus also produce manufacturing items including an instruction means performing a function described in each block of the block diagrams or each step in the flowcharts. The instructions, when executed by the computer, a processor, or other programmable data processing equipment may case the computer, the processor, or the other programmable data processing equipment to perform a series of operational steps for executing the functions described in each block of the block diagram or each step in the flowcharts.

Each block or each step may represent a part of a module, a segment, or a code that includes one or more executable instructions for executing a specified logical function(s). It is be noted that in some alternative embodiments, the functions mentioned in the blocks or steps may occur in a different of order. For example, two successive blocks or steps illustrated may in fact be performed substantially concurrently or the blocks or steps may be sometimes performed in a reverse order according to the corresponding function.

As described above, the exemplary embodiments have been described and illustrated in the drawings and the specification. The embodiments were chosen and described in order to explain certain principles of the disclosure and their practical application, to thereby enable others skilled in the art to make and utilize various embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, can be made by those skilled in the art. Many changes, modifications, variations and other uses and applications of the present disclosure should become apparent to those having ordinary skill in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. An Ethernet controller for a vehicle, comprising:
a Transmission Control Protocol/Internet Protocol (TCP/IP) module configured to continuously transmit a series of data packets having a collective size as large as a set window size or less regardless of receiving acknowledgement (ACK) from a receiver, the window size being initially set to a window size value acquired from the receiver; and
a window size resetting unit configured to reset the window size to a reduced value when a duplicate acknowledgement (DUP ACK) is received from the receiver, wherein the reduced value corresponds to an amount of data in data packets continuously transmitted up to a data packet corresponding to the received DUP ACK.

2. The Ethernet controller of claim 1, wherein the window size resetting unit is configured to reset the window size according to i) a number of data packets continuously transmitted up to a data packet corresponding to the received DUP ACK and ii) a maximum transmission unit (MTU) size.

3. The Ethernet controller of claim 2, wherein the window size resetting unit is configured to reset the window size to a result of multiplication of i) the number of data packets continuously transmitted up to the data packet corresponding to the received DUP ACK with ii) the MTU size.

4. The Ethernet controller of claim 1, wherein the TCP/IP module is configured to, when the DUP ACK is received, retransmit one or more data packets, in the series of data packets, that follow a data packet corresponding to the received DUP ACK, starting with a data packet that immediately follows the data packet corresponding to the received DUP ACK.

5. The Ethernet controller of claim 1, wherein the window size resetting unit is configured to independently reset the window size according to respective DUP ACKs received from a plurality of receivers.

6. A method for transmission of data by an Ethernet controller for a vehicle, the method comprising:
setting a window size to a window size value acquired from a receiver;
continuously transmitting a series of data packets having a collective size as large as the set window size or less regardless of receiving acknowledgement (ACK) from the receiver;
resetting the window size to a reduced value when a duplicate acknowledgement (DUP ACK) is received from the receiver, wherein the reduced value corresponds to an amount of data in data packets continuously transmitted up to a data packet corresponding to the received DUP ACK; and
continuously transmitting another series of data packets having a collective size as large as the reset window size or less regardless of receiving ACK from the receiver.

7. The method of claim 6, wherein resetting the window size comprises resetting the widow size according to i) a number of data packets continuously transmitted up to a data packet corresponding to the received DUP ACK and ii) a maximum transmission unit (MTU) size.

8. The method of claim 7, wherein resetting the window size comprises resetting the widow size to a result of multiplication of i) the number of data packets continuously transmitted up to the data packet corresponding to the received DUP ACK with ii) the MTU size.

9. The method of claim 6, further comprising, when the DUP ACK is received, retransmitting one or more data packets, in the series of data packets, that follow a data packet corresponding to the received DUP ACK, starting with a data packet that immediately follows the data packet corresponding to the received DUP ACK.

10. The method claim 6, wherein resetting the window size comprises independently resetting the widow size for each of a plurality of receivers according to respective DUP ACKs received from the plurality of receivers.

* * * * *